Patented July 27, 1937

2,088,000

UNITED STATES PATENT OFFICE 2,088,000

MOTOR FUEL COMPOSITION

Will R. Savage, Omaha, Nebr., assignor of one-half to Harry S. Haze, Chicago, Ill.

No Drawing. Application July 31, 1934, Serial No. 737,857

2 Claims. (Cl. 44—9)

The invention relates to a motor fuel.

An object of the present invention is to improve petroleum fuel both for use in internal combustion engines and also for open air burning and to enable the same when employed as a fuel for internal combustion engines to afford quicker starting, faster pick-up or acceleration, more power and increased mileage, smoother operation, greater flexibility of speed between extreme limits of low and high with cooler operation than is afforded by ordinary petroleum fuel products.

Another object of the invention is to eliminate hard carbon deposits and leave only a soft oily or moist carbon deposit in reduced quantity.

A further object of the invention is to effect a reduction or practical elimination of carbon monoxide by more complete combustion than has heretofore been obtained under practical conditions of engine operation.

Heretofore alcohol has been mixed with petroleum fuel products in large proportions, as high as a fifty to fifty per cent (50 to 50%) mixture of gasoline and alcohol for conserving the supply of gasoline and increasing the volume of fuel available for use as a motor fuel for internal combustion engines and for other economic reasons and as commercial alcohol contains water and is not miscible in any proportions with gasoline, it has been necessary to employ a blending agent to render such commercial alcohol miscible with the gasoline.

The invention consists in the use of a cold chemical mixture of alcohol, naphthalene and acetone and in a combination of alcohol and acetone and also in a combination of naphthalene and acetone for mixture with various grades of petroleum and petroleum fuel products for controlling and improving the combustion qualities thereof by chemical means. The essential novelty resides in an abnormal reduction of the proportion as a whole of the combined ingredients used in conjunction with the various petroleum fuel products and an equally abnormal change in the proportions of the ingredients as related to each other in their combination and use in petroleum fuel products as compared with all previous and present practice. These abnormal changes in the two directions mentioned produce a very decisive improvement in the quality of the combustion of the petroleum fuel products treated and in motors and motor cars produce remarkable improvements in the performance thereof, heretofore not attained and not attainable with the greater proportions of the chemical ingredients heretofore used in combination with gasoline, naphtha and other petroleum fuel products.

Improvements in petroleum fuel products have related heretofore mostly to processes for obtaining a larger percentage of automobile fuel of lighter specific gravity and lower initial distillation point to supply the vast quantities of gasoline and motor fuel used in automobiles. Chemical treatment for improved combustion of the refined petroleum fuel for use in motor cars from a practical standpoint in use has been restricted mostly to the addition of lead or equivalent metals in various forms to reduce or eliminate the fuel knock. One of these forms is a preparation containing tetra ethyl of lead added to the refined fuel commonly referred to as high test gasoline and giving an increased octane rating or anti-knock quality to the gasoline when used as motor fuel.

Another form embraces a mechanical device installed as an accessory to the automobile or motor vehicle and having a small chamber coated or lined with lead or in combination with other metallic ingredients and by means of tubular connections the untreated gasoline or motor fuel is passed through and in contact with the metal or metals dissolving a minute portion sufficient for treatment of the fuel to obtain the desired results in the automobile engine. The lead treatment apparently slows down the explosive action of the motor fuel giving better combustion, smoother operation, greater anti-knock value and burns up the carbon, but creates a hotter flame and heats up the engine in operation more than the result obtained when using the untreated gasoline or motor fuel.

It is the purpose of the present invention for automobile use to retain and add to the qualities embodied in the higher test gasoline; namely, quicker or easier starting, smoother operation, faster pick-up, more power, less carbon and also make a complete temperature reversal of the lead treatment of gasoline motor fuel, whatever the means of its application and use, by making the engine run cooler than the untreated gasoline or motor fuel and through more perfect combustion add to the mileage of a given quantity of fuel used in an automobile.

By way of an example, one method of carrying out my invention is to mix approximately five (5) parts of alcohol, ten (10) parts of acetone and one (1) part of naphthalene. Previous to adding the naphthalene to the alcohol and acetone, the naphthalene is dissolved in gasoline for convenience but it may be added to or mixed with the alcohol and the acetone in any other desired manner. Generally not over one per cent (1%) or less than one twenty-fifth (1/25) of one per cent (1%), by volume, of the mixture is added to the petroleum fuel product to be treated. This relatively small amount of the cold chemical product is much less than the fifty and fifty per cent (50 and 50%) combination and lesser large combinations heretofore employed in the mixing of alcohol and gasoline. The formula may be varied within the said limits of one per cent (1%) maximum and one twenty-fifth (1/25) of one per cent (1%) minimum of the mixture according to higher and lower grades of the petroleum fuel products to be treated, the lower grades requiring more of the cold chemical mixture than the higher grades.

Ordinary gasoline does not contain naphtha or naphthalene but synthetic gasoline consisting of a lower grade of petroleum fuel to which casing head gas has been added to bring it up to the ordinary gasoline standard, does contain naphtha and does not require this element of the formula consisting of a combination of alcohol, naphthalene and acetone and the following formula may be employed for petroleum fuel products containing naphtha. This formula consists of approximately one (1) part of alcohol and one (1) part of acetone. In treating petroleum fuel products containing naphtha the same proportion of generally not over one per cent (1%) of the mixture and not less than one twenty-fifth (1/25) of one per cent (1%) of the mixture, by volume, is employed.

Also, advantageous results may be obtained by treating petroleum fuel products with a cold chemical mixture of naphthalene and acetone in the proportion of approximately eight (8) parts of acetone to one (1) part of naphthalene, by volume.

The formula using substantially equal parts of alcohol and acetone may also be used to advantage with the several grades of petroleum fuel other than that containing naphtha providing it is kept within the limitations of generally less than one per cent (1%) maximum and a minimum of one twenty-fifth (1/25) of the petroleum fuel treated.

To facilitate the measurement of the proportional parts of the formulas, one (1) grain by weight of naphthalene is considered approximately equal to one (1) drop, liquid measure, of either the acetone or alcohol used.

The first formula and the third formula are not applicable to petroleum fuel products containing naphtha but in treating petroleum fuel products the proportion of the cold chemical mixture to be added to the petroleum fuel product to be treated is the same with each of the said formulas. The extremely small amount of the cold chemical mixture added to the petroleum fuel products produces a more complete combustion of the fuel and reduces the temperature in engine performance instead of increasing the temperature as is the case with lead treated gas, the reduction or elimination of carbon monoxide gas, increased mileage and smoother engine operation and the other anti-knock and fuel improvements heretofore explained and it has been found by experience that an increasing of the proportions of the cold chemical mixture of the present invention beyond those specified is not only not beneficial but fails to obtain the novel advantages and results produced by a mixing of approximately not over one per cent (1%) and less than one twenty-fifth (1/25) of one per cent (1%) of the mixture with the petroleum fuel products to be treated.

Several distinct methods have been invoked to check up and prove the attainment of the objects and advantages of the cold chemical mixture of the present invention.

These are greater mileage, increased air to fuel ratio with leaner mixture, reduction of carbon monoxide gas, reduction of carbon with soft deposit, smoother operation, cooler operation, and a more dry gasoline or motor fuel obtained by expulsion of water held in suspension.

Over thirty-five thousand (35,000) miles of road tests upon various makes of automobiles from low to high compression in all kinds of adjustments and conditions for operation, good, bad and indifferent, new, medium-aged and old models, with many different drivers, during every season and month of the year, ranging in temperature from one hundred and twelve degrees (112°) in the shade to subzero weather, extremely dry weather to foggy and heavy rain, were made on good and bad pavement, gravelled and dirt roads, both wet and dry. These road tests were made on level roads, hilly roads, partly level and partly hilly and on long and at places quite steep or heavy gradients in montainous sections with no adverse results and in general superior results. No valve or spark plug trouble from fouling with carbon were manifested in any of these prolonged tests and the carbon formed was less under proper adjustment of the motor than when using the untreated gasoline or motor fuel. Another advantage is the carbon formed with the treated gasoline or motor fuel is a soft somewhat moist or oily compound which does not bake on or corrode spark plug points or valve seats and can easily be removed by wiping off the surface on which it is deposited and will not prevent a valve seating properly like a hard carbon deposit does.

On road tests I have found that no true record of performance in the practical sense, or scientific either, can be obtained, but only an approximation, without making runs of seventy-five (75) to one hundred and fifty (150) or more miles and using not less than four (4) to five (5) gallons of gasoline or motor fuel, since the average record should conform to average use.

I have also ascertained that after using one grade of gasoline or motor fuel operating at a fixed temperature, that another grade of gasoline or motor fuel operating at a different temperature in the same motor requires the running of a gallon more or less according to weather, and conditions in the engine before the temperature will conform to the temperature required for the maximum or best results of each succeeding test in uniform relation. Laboratory equipment using one-tenth (1/10) of a gallon to a test purporting to give an idea of the fuel or mileage value of different gasolines or motor fuels does not work out in practice with any degree of accuracy, that is reliable for true scientific development and improvement. A further demonstration of the failure of laboratory equipment developed and standardized to function on a given product of known quality, is shown in comparative demonstration by the fact that the octane machine and octane test as a true scientific measure of the anti-knock value of a motor fuel, which does function on gasoline and gasoline treated with the addition of lead, does not function properly when testing the treatment of the gasoline or motor fuel with the cold chemical mixture of the present invention.

Taking tests of different grades of gasoline or motor fuel in direct comparison, I have obtained the following results:

| Gasoline untreated Octane test | Same gasoline treated Octane test |
|---|---|
| 66 | 67 |
| 56 | 57½ |
| 52½ | 52½ |
| 50 | 50 |

It is obvious that the octane test shows little or no change on the octane machine in the anti-knock value by the addition of the cold chemical mixture of the present invention, yet by using the automobile as a laboratory equipment, I have been able to reduce and at times entirely eliminate the fuel knock, the condition of the car producing the variable result. The same results are likewise evident in the use of high test gasoline and lead treated gasoline when used in cars, the reduction of the fuel knock or the complete elimination of the fuel knock resulting according to the condition of the car and its adjustment suitable or otherwise to the gasoline or motor fuel used.

The result of more perfect combustion resides in an adjustment of the spark control to prevent preignition, the advancement of the timing to the maximum limit for greater mileage and still retain coordination of the firing functions, the proper admixture of air and the right amount of fuel to form the best explosive mixture, coupled with a given compression and a gasoline fitted to the adjustments made.

An adjustment of the car for a particular grade of gasoline will not work to the best advantage on a different grade of gasoline and a car adjusted for anti-knock features on one grade of gasoline may knock with a different grade of gasoline on the same adjustment and yet be readjusted so that the latter gasoline or motor fuel tested will not knock and yet have no change made in the gasoline or motor fuel quality.

Thus, when cars are adjusted at the factory according to laboratory equipment to fit the present standard of high test gasoline or motor fuel, a readjustment on some points on the motor may be necessary to fit my treated gasoline and motor fuel and lower grades of gasoline for the best performance.

Using a fuel ratio analyzer on the exhaust gases from the motor on normal proportion of air and gasoline or motor fuel, the present fuel in use gives a ratio of twelve and one-half (12½) to thirteen (13) to one (1) of air and gasoline or other motor fuel, whereas treatment of the same gasoline with the cold chemical mixture of the present invention shows a normal or proper proportion of fourteen (14) or over to one (1) on air and gasoline or other motor fuel showing a gain of approximately ten per cent (10%) in the use of air. This checks back with the general average gain on mileage in road tests of my treated gasoline or motor fuel over the untreated gasoline or motor fuel, and proves its advantage checking closely by two diverse methods, one checking on the more complete combustion through the use of more air and the other the power gained through this more complete combustion as registered in increased mileage on the road.

Showing the great variation on the road in practice of the use of my formula as compared with the untreated gasoline or motor fuel, I have taken a car in a going condition and with the use of third grade low test gasoline or motor fuel obtained a mileage of ten (10) to twelve per cent (12%) above that obtained by my treatment of the same gasoline or motor fuel or by the use of the high test fully treated lead formula gasoline or motor fuel.

After reconditioning the car with new rings, taking up bearings, cleaning out carbon, regrinding valves, putting in new spark plugs, new spark coil, new battery and repairing vacuum pump, a gain in mileage of about seven per cent (7%) was made on untreated gasoline, twenty-five per cent (25%) on the high test lead treated gasoline and seventy per cent (70%) maximum on my treated motor fuel over the previous record of the car in poor condition. Checking against the new mileage record of the untreated gasoline, my gain on treated motor fuel was thirty-five per cent (35%) but the average run of cars will average nearer a ten per cent (10%) gain in mileage rather than more or less.

Another check proved both by the air fuel ratio analyzer and by the road tests with the thermometers in comparison of temperatures proved that my treated motor fuel runs cooler than the untreated gasoline and smaller jets can be used in the carburetor than is customary or the standard set up or approved by the manufacturer. The use of these smaller jets when used in conjunction with my motor fuel gives an increase from ten (10) to twelve per cent (12%) in mileage over the same treated motor fuel when using the standard or larger size jets, proving that I can use a leaner mixture than is common to some of the gasoline or motor fuel in commercial use.

Another advantage which is very important is that the chemicals which I use are not poisonous in ordinary handling and are only adjudged so for internal use and made so by law to prevent such use. The use of lead is accompanied by the danger of poisoning to workmen handling it and to customers who may get the mixture in cuts, wounds or upon skin infections. It also stains clothes and cannot be used in lamps, stoves, furnace burners or open combustion service. My formula is free from all of these injurious factors and petroleum fuel treated by my formula may be used in open combustion service.

Heretofore, it has been obvious to the petroleum industry that a higher test gasoline or motor fuel giving quicker starting, faster pick-up, smoother operation, more power and speed was only attained by sacrificing mileage and that if you wanted mileage by going to a lower test gasoline or motor fuel then you sacrificed these other favorable qualities. In other words, it was considered impossible to obtain both objects of mileage and desirable performance simultaneously in one product, yet my formula gives this dual result.

With the lower gravity motor fuel there is present greater carbon content. By using a higher initial distillation temperature with this motor fuel, the end point of distillation is much higher than the lighter gasoline or motor fuel. The addition of my treatment to this cheaper grade of gasoline or motor fuel without any decided change in gravity or initial distillation of the untreated gasoline or motor fuel shows a normal curve on the various readings as the temperature of the distillation rises until the end point is quite close to that of the untreated gasoline or motor fuel, the chemical proof of more mileage by distillation tests and smoother operation. Road tests prove that this treated gasoline or motor fuel is equal to or superior in quality when compared with all the other advantages of high test gasoline or motor fuel. It is an accepted fact in the petroleum industry that the lower gravity gasoline or motor fuel possessing a higher percentage of carbon has more power if the carbon content could be more effectively burned.

The presence of carbon monoxide in exhaust gases proves that the carbon in gasoline and other motor fuel has been burned to some extent, to carbon monoxide, and in this form delivers less than one-third ($\frac{1}{3}$) of its heat energy with consequent loss of power and waste of fuel. Aside from the economic waste, carbon monoxide is a very dangerous toxic poison resulting in frequent deaths of persons inhaling these fumes in confined places, in closed cars, garages or any similar conditions. The addition of these deadly carbon monoxide fumes in congested districts of automotive vehicular traffic in the towns, cities and highways, while not fatal in their immediate effect on people compelled to breathe this vitiated air, certainly renders it inimical to their health and any practical elimination of the hazard to health makes a decided social value improvement.

The proper adjustment of air and fuel ratio with the addition of my treatment for controlled combustion greatly reduces or practically eliminates this hazard to life of the car user as attested by the various tests mentioned and proved especially by the smoothness of operation, increased power and mileage.

As a test of smooth operation, I have tested the formula on cars with special high compression ratios and special high gear ratios and on one car where the speed with high test gasoline with full lead treatment, the only kind that could be used, on account of poor grades knocking and could not be run below ten (10) miles per hour using the high test motor fuel without getting jerky, with my formula and low test gasoline or motor fuel I have put the same car down to a speed of one (1) mile per hour on the level and pulled a good grade on high at one and one-half (1½) miles per hour without a tremor.

Understanding somewhat the nature of explosive compounds through using black powder, smokeless powder and dynamite of varying per cent of nitroglycerine content, I have sought in this chemical mixture to prolong the burning of the explosive mixture within the cylinder during the piston movement, so as to get an increasing pressure through a greater portion or the entire distance of the stroke, similar to the action of steam in an engine or the continuous expansion of smokeless powder back of a projectile during its passage through the barrel of a rifle or other form of gun. The fact that I can and do in operation practically eliminate vibration from the motor at any and all speeds apparently proves such objective and result has been attained in practice.

Another factor of importance inherent with this treatment resides in its harmonic operation when combined with the lead treated gasoline whether combined with the chemically lead treated gasoline or using the formula with the gasoline flowing through a lead coated or treated channel or receptacle as an accessory attached to the car.

The cooling effect of this formula modifies the heating effect of the lead treatment causing the combined treatment to run cooler than the lead treatment by itself and without impairing the anti-knock feature of either formula but rather adding thereto and when treated with the normal or less than the normal amount of my formula as used with gasoline or motor fuel alone and the normal or less than normal treatment of the lead formula, I find there is a still further gain in mileage due to the dual combination of both formulas more or less equal to the gain registered with the use of my formula with gasoline or motor fuel alone. The use of my formula in combination with naphtha, kerosene, distillate or lower grades of petroleum causes a small increase in gravity tests and a decided lowering of the initial distillation point without a corresponding proportional drop in the end point of distillation test, this latter holding closer to the end point distillation test of the untreated fuel. Another drawback to the use of the cheaper grades of petroleum fuel aside from the carbon deposits is due to certain resinous gums which tend to coat and clog the feed line and other fine apertures which are a part of pumps and carburetors. This formula which I use has a solvent effect both on the gums and carbon deposits and counteracts or overcomes these detrimental factors.

During the initial development of the formula, I used the three chemicals, acetone, alcohol and flaked or solid naphtha in separate combinations with the gasoline or motor fuel and while each one of the combinations gave a lively gasoline or motor fuel with better performance, each and every one of them reduced the mileage on road tests as compared with the untreated gasoline or motor fuel used in the car in these mixtures, being similar in a way to higher test gasoline or motor fuel. The acetone seems to function with increased power but runs rough instead of smooth. When acetone is combined with naphtha in the gasoline or motor fuel in the proportions stated it runs reasonably smooth and gives an increase in mileage over the untreated gasoline. Similar results ensue when acetone is combined with alcohol. A combination of the acetone, alcohol and naphtha in proper proportions to the grade of gasoline treated gives the smoothest and coolest operation with maximum mileage as compared with the two dual combinations of acetone and naphtha and acetone and alcohol. The use of acetone in small proportion to a much larger amount of alcohol when mixed with alcohol to overcome the water content of the latter is its function for causing the alcohol and gasoline to combine as it is now or has been previously used. Alcohol combined with gasoline to provide a market for the alcohol and conserve the supply of gasoline is required in many countries by civil law or legal compulsion at the ratio of from ten (10) to fifty per cent (50%) of alcohol to the amount of gasoline used. These laws are based on the economic aspect rather than to meet any decided beneficial or technical improvement of the fuel.

Naphthalene may be added to gasoline taken off at the refinery above the naphtha run to improve its quality but as it is a natural ingredient of petroleum fuel run off at a lower gravity within the distillation range of naphtha the petroleum fuel already contains this product and the addition then of acetone and alcohol completes the formula for low grade gasoline or motor fuel.

In order to raise the gravity and lower the initial distillation of this low grade gasoline or motor fuel, casing head gas is mixed with it, but the result is an irregular firing mixture of fuel. The addition of my formula to the above mixture corrects this irregular firing action. The maximum formula for the treatment of any grade of petroleum fuel of these elements in any of their combinations with the same is approximately one per cent (1%) or less of their combined total by volume as combined with any given amount of petroleum of any grade. As the initial distillation test is lowered and the gravity test is raised for any given grade of petroleum fuel, the proportions of the chemicals used in the formula are rapidly reduced until the minimum of approximately one twenty-fifth ($\frac{1}{25}$) of one per cent (1%) of the chemicals are used in combined quantity as based on the gasoline or motor fuel treated.

Acetone is miscible with both water and gasoline separably and is used with the large proportional mixture of alcohol where these are combined with gasoline to hold the alcohol in solution which will not mix if placed together without some combining agent. Butyl alcohol being less refined than commercial alcohol and possessing more of the solvent elements of acetone which is a by-product of alcohol manufacture combines more freely with the gasoline or other petroleum fuel. The lower grades of petroleum fuel hold a small amount of water in suspension and although acetone is miscible with water and petroleum fuel separably, I have found that a small amount of acetone added to petroleum fuel has the effect of precipitating or throwing out the water held in suspension in petroleum fuel. The addition of the small amount of alcohol or naphtha in the formula does not change or alter the tendency on the part of acetone to create a dry petroleum fuel practically free from water content held in suspension therein.

The cold chemical mixture applied to various grades of petroleum fuel controls and improves the combustion of the same in open flame and also in its use in internal combustion engines in the form of explosive mixtures. Its comparatively non-poisonous factors in the preparation or use is an advantage aside from the functions of the elements of the combination.

The treated petroleum fuel possesses superior advantages in its cooler and smoother operation, increased mileage, more effective operation at lower speeds and at all speeds up to and including high speeds with practical freedom from vibration of the engine when running. Also substantial reduction or practical elimination of carbon monoxide in exhaust gases or fumes results from the more effective combustion due to the chemical treatment of the present invention.

While the fuel particularly described and the method of making it constitute preferred embodiments of the invention other forms of embodiments might be devised all coming within the scope of the invention as set forth in the appended claims.

What is claimed is:

1. A motor fuel composition composed of gasoline and approximately less than one per cent of a mixture consisting of acetone, alcohol and naphthalene combined in substantially the proportions of one part of naphthalene, five parts of alcohol and ten parts of acetone.

2. A liquid motor fuel composition comprising a light volatile petroleum distillate and approximately less than one per cent of a mixture composed of acetone, alcohol and naphthalene combined in substantially the proportions of one part of naphthalene, five parts of alcohol and ten parts of acetone.

WILL R. SAVAGE.